April 3, 1951     A. J. EBER     2,547,451
REVERSIBLE AUXILIARY HANDLE FOR LAWN TRIMMERS
Filed Oct. 3, 1947     2 Sheets-Sheet 1
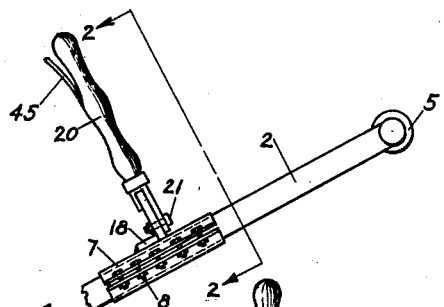
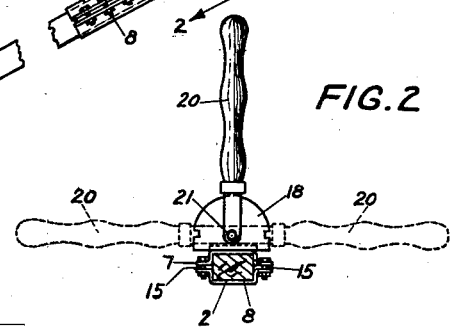
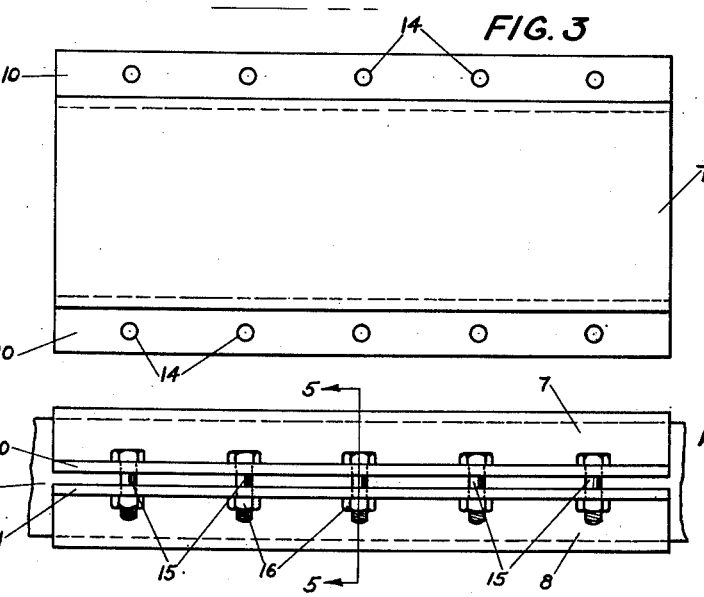
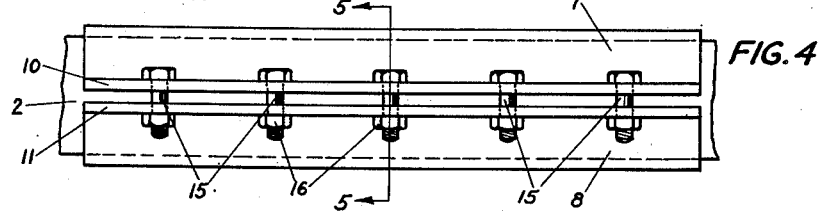
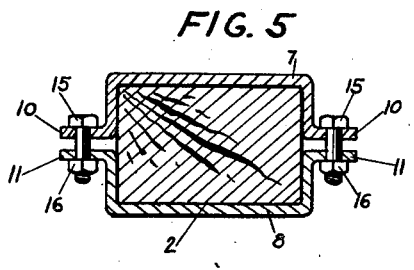
Inventor
ALFRED J. EBER
By
McMorrow, Berman & Davidson
Attorneys

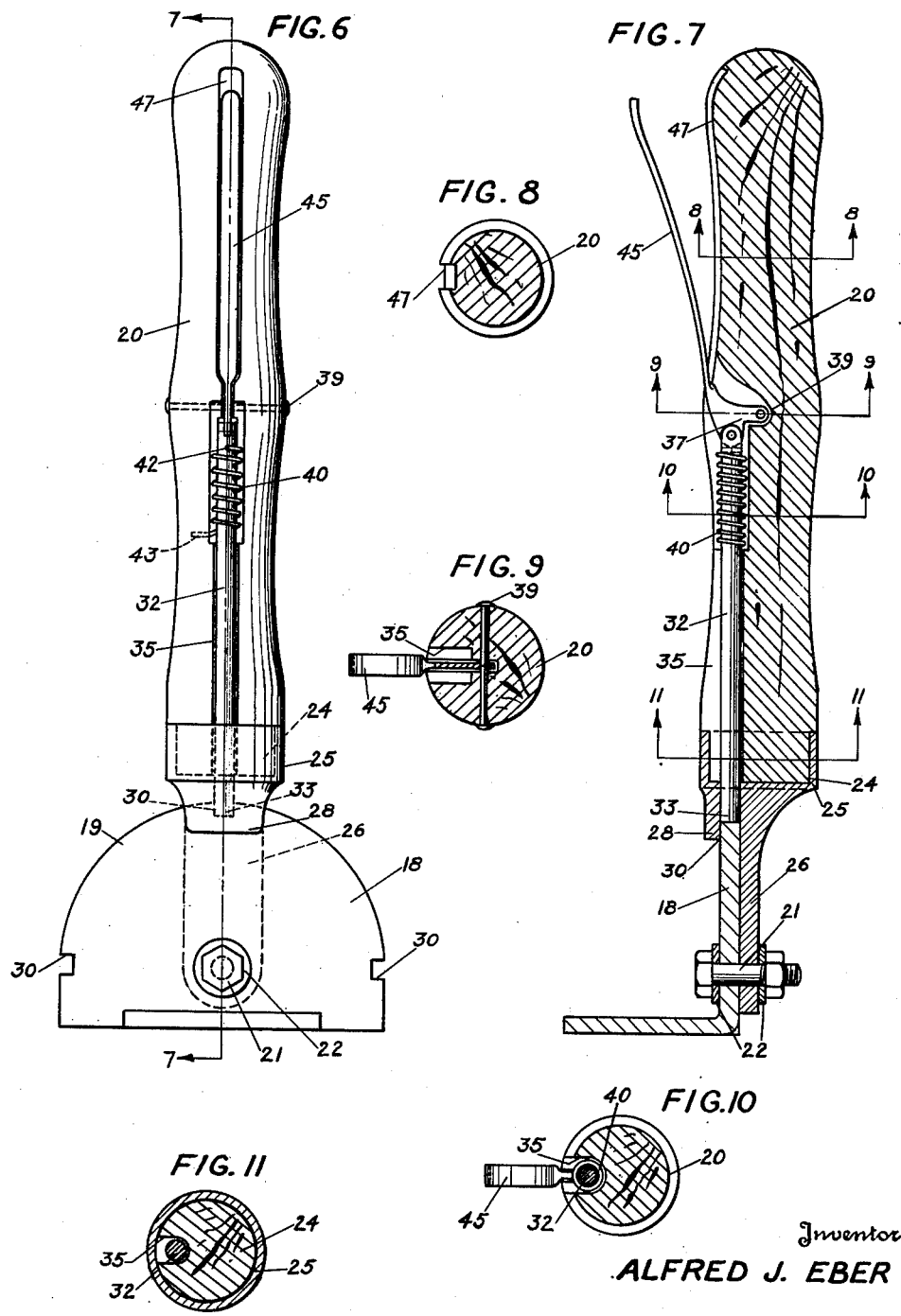

Patented Apr. 3, 1951

2,547,451

UNITED STATES PATENT OFFICE 2,547,451

REVERSIBLE AUXILIARY HANDLE FOR LAWN TRIMMERS

Alfred J. Eber, Monroe, Mich.

Application October 3, 1947, Serial No. 777,752

2 Claims. (Cl. 16—111)

1

This invention relates to an improved handle structure for lawn trimmers or the like, and has particular application to an attachment for existing handle structures to provide additional leverage in guiding and operating such a machine.

The invention has for its chief object the provision of an attachment capable of ready application to the handle of a machine of the character referred to, without alteration of the conventional handle structure, and adjustable to any convenient position on the same.

A further object is to provide a handle attachment for the shaft of the handle of a machine of the character referred to, acting as an auxiliary lever to give greater ease to the control and operation of the machine.

A still further object is the provision of an auxiliary handle of simple design and rugged construction for attachment to the handle of a machine of the character referred to, and capable of being adjusted to various positions to permit the machine to be operated from either side thereof, according to the particular conditions of use.

The above and other objects and advantages of the invention are accomplished by the provision of the hereinafter-described reversible handle structure, comprising, briefly stated, a clamp for attachment to the shaft of the handle of a machine of the character referred to, an angle plate fixed to the clamp, and an auxiliary handle adjustably carried by the angle plate.

The invention will best be understood from the following description, constituting a specification of the same, when taken in conjunction with the annexed drawings, wherein:

Figure 1 is a side elevational view of the invention showing the same applied to a lawn trimmer of conventional design;

Figure 2 is a cross-sectional view taken along the line 2—2 of Figure 1, looking in the direction indicated by the arrows;

Figure 3 is a plan view on an enlarged scale of one part of the clamp by which the reversible handle is secured to the shaft of the handle structure of the machine;

Figure 4 is a side elevational view showing the parts of the clamp in position on the shaft of the handle structure of the machine;

Figure 5 is a cross-sectional view taken along the line 5—5 of Figure 4, looking in the direction indicated by the arrows;

Figure 6 is an enlarged front elevational view of the reversible handle structure removed from the clamp;

Figure 7 is a vertical cross-sectional view taken

2 along the line 7—7 of Figure 6, looking in the direction indicated by the arrows;

Figure 8 is a transverse cross-sectional view taken along the line 8—8 of Figure 7, looking in the direction indicated by the arrows;

Figure 9 is a transverse cross-sectional view taken along the line 9—9 of Figure 7, looking in the direction indicated by the arrows;

Figure 10 is a transverse cross-sectional view taken along the line 10—10 of Figure 7, looking in the direction indicated by the arrows;

Figure 11 is a transverse cross-sectional view taken along the line 11—11 of Figure 7, looking in the direction indicated by the arrows.

While the invention will be described hereinafter in connection with a particular embodiment of the same, it will be understood that the same can be applied with equally satisfactory results wherever a secondary adjustable auxiliary handle is needed, or desirable, on a machine or tool of the general type referred to, having a primary handle shaft, and the invention is therefore not to be limited to the particular application and arrangement illustrated in the drawings.

Referring to the drawings in greater detail, 1 indicates a lawn trimmer, or similar machine, as seen in dotted lines in Figure 1, having a conventional handle structure 2, usually of generally rectangular cross-section, as best seen in Figures 2 and 5. The handle 2 is in the form of a shaft of wood, or other suitable material, secured to a yoke 3 by suitable means, such as bolts 4, and is provided at its free ends with a hand grip portion 5 of usual design.

The auxiliary reversible handle structure with which the invention is particularly concerned is attached to the shaft 2 by a clamp comprising a pair of opposed channel-shaped members 7 and 8 having out-turned flanges, as indicated at 10 and 11 in Figure 5. The channel members 7 and 8 are preferably of a depth somewhat less than half the thickness of the shaft 2, so that when the same are positioned on the shaft, the out-turned flanges 10 and 11 are slightly spaced apart, as indicated in Figure 5. The out-turned flanges 10 and 11 may conveniently be provided with holes 14 for the reception of bolts 15 provided with nuts 16, by which the clamp is secured in position on the shaft 2. By this means the clamp can be positioned at any desired point throughout the length of the shaft 2, and will be firmly held in place on the same.

An angle plate 18 is secured upon the clamp member 7, as best seen in Figure 1, by welding or other suitable means. The outwardly extending flange of the angle plate 18 is of semi-circular configuration, as indicated at 19, and carries an adjustable handle 20, pivotally secured at one end to the flange of the angle plate by a bolt 21 and disposed substantially perpendicular to the main handle 2. The bolt 21 may be provided with washers 22, whereby the handle 20 is pivotally secured on the angle plate 18 without undesirable loose play.

The handle 20 may desirably be formed of wood or other easily-shaped material, and at its bottom end 24 is inserted in a socket 25 at the upper end of a flattened bar 26 through which the bolt 21 passes. The bar 26 has a relatively large surface in engagement with the angle plate 18, so that the handle may be moved without undue wobbling or loose play. A projection 28, extends downwardly from the socket 25 to bear against the angle plate 18 opposite the bar 26 to further guide the handle 2 in its motion about the semi-circular edge 19 of the angle plate.

Notches 30 are provided in the rounded edge 19 of the angle plate 18 for a purpose later to be made apparent.

The handle 20 is provided with a longitudinally extending groove 35 and a rod 32 is slidably mounted in this groove and is selectively engageable at its end 33 adjacent the flange edge 19 in the notches 30.

At its upper end the rod 32 is pivotally secured to a link 37, which in turn is pivotally attached to the handle 20 by a pin 39. A coil spring 40 surrounds the upper end of the rod 32, one end of the spring being inserted through a hole 42 in the rod, and the other end of the spring being secured to the handle 20, as indicated at 43 in Figure 6. It will thus be seen that the action of the coil spring 40 is to force the rod 32 downwardly longitudinally of the handle 20 at all times.

The link 37 has an extension 45, extending upwardly along the handle 20 above the rod 32, by which the rod may be moved upwardly against the spring 40 for releasing the end 33 of the rod from the notches 30 of the angle plate 18. The extension 45 is held in its outward position, as indicated in Figure 7, when the end 33 of the rod 32 is in engagement with one of the notches 30, and upon depressing the extension 45 into a slot 47 in the base of the handle 20, the rod 32 is lifted out of the notches.

In using the invention as described above, the two halves 7 and 8 of the clamp are positioned at any desired location on the shaft 2 and firmly secured in place by tightening the bolts 15. The handle 20 is then rotated to the desired position, by depressing the extension 45 into the groove 47 and moving the handle about the curved edge 19 of the angle plate 18. As soon as the handle 20 has been brought to the desired position, the extension 45 is released, permitting the lower end 33 of the rod 32 to enter one of the notches 30, thus firmly holding the handle in its adjusted position. The handle 20 can thus be used to secure additional leverage in guiding and operating the machine 1.

In the specific embodiment of the invention described above, the same is applied to a lawn trimmer particularly useful in trimming the edges of lawns. Such a machine is frequently operated in locations which makes it necessary to operate the machine from one side of the same, such as when trimming the grass close to a fence, wall, or other structure.

In such a location, the invention affords a great advantage over handles of conventional construction, in that the auxiliary handle may be positioned at either side of the shaft 2, as convenience or necessity may dictate, thus providing a means by which additional leverage may be obtained for guiding and operating the machine in locations where it would otherwise be inconvenient or impossible to use the same. The additional leverage provided by the auxiliary handle is also especially useful when cutting the grass about the borders of flower beds, where it is necessary to maintain one wheel of the trimmer out of contact with the ground over the flower bed while the other wheel engages the ground adjacent the bed.

It will, of course, be understood that the above-described embodiment of the invention is intended for purposes of illustration only, and many changes may be made in the proportions and arrangement of the various parts without departing from the spirit of the invention, or the scope of the appended claims.

Having thus clearly shown and described the invention, what is claimed and desired to secure by Letters Patent is:

1. In combination with a lawn mower having a handle shaft, a clamp embracing said shaft intermediate the length of the latter, a flange upstanding from said clamp, and an auxiliary handle pivotally secured at one end of said flange and extending outwardly from said shaft substantially perpendicular to the latter, said auxiliary handle being movable about its pivotal connection with said flange substantially through a semi-circular range of movement; said flange having angularly spaced apart notches in its edge, and manually operated detent means carried by said auxiliary handle and engageable in said flange notches to releasably lock said auxiliary handle in respectively different operative positions.

2. In combination with a main handle, a clamp embracing said main handle intermediate the length of the latter, a flange upstanding from said clamp and having an arcuately curved edge provided with spaced apart notches, an auxiliary handle pivotally secured at one end to said flange and extending outwardly from said main handle substantially perpendicular to the latter, said auxiliary handle being movable about its pivotal connection with said flange from one to another of different operative positions corresponding to the locations of the notches in the curved edge of said flange, an element movably mounted on said auxiliary handle and selectively engageable in said notches, resilient means acting between said auxiliary handle and said element urging said element into notch engaging position, and manually operated means carried by said auxiliary handle and connected to said element for moving said element away from its notch engaging position to free said auxiliary handle for movement from one to another of its operative positions.

ALFRED J. EBER.

REFERENCES CITED

The following references are of record in the file of this patent:

UNITED STATES PATENTS

| Number | Name | Date |
| --- | --- | --- |
| 402,142 | Collett | Apr. 30, 1889 |
| 599,208 | White | Feb. 15, 1898 |
| 624,739 | Beall | May 9, 1899 |
| 998,038 | Ressler | July 18, 1911 |
| 1,389,249 | Kitchel | Aug. 30, 1921 |
| 1,441,144 | Cutler | Jan. 2, 1923 |
| 2,244,585 | Tweit | June 3, 1941 |